United States Patent
Hung et al.

(10) Patent No.: US 10,839,516 B2
(45) Date of Patent: Nov. 17, 2020

(54) SIMULATE SEGMENTATION METHOD OF CYLINDER AND PIE CAKE DIGITAL MODELS

(71) Applicant: INSTITUTE OF NUCLEAR ENERGY RESEARCH, ATOMIC ENERGY COUNCIL, EXECUTIVE YUAN, Taoyuan (TW)

(72) Inventors: Yu-Hsiang Hung, Taoyuan (TW); Chung-Hao Huang, Taoyuan (TW); Shiang-Fong Chen, Taipei (TW); Po-Chou Tsai, Taipei (TW)

(73) Assignee: INSTITUTE OF NUCLEAR ENERGY RESEARCH, ATOMIC ENERGY COUNCIL, EXECUTIVE YUAN, Taoyuan (TW)

( * ) Notice: Subject to any disclaimer, the term of this patent is extended or adjusted under 35 U.S.C. 154(b) by 80 days.

(21) Appl. No.: 16/354,429

(22) Filed: Mar. 15, 2019

(65) Prior Publication Data
US 2020/0051248 A1    Feb. 13, 2020

(30) Foreign Application Priority Data
Aug. 13, 2018    (TW) .............................. 107128202 A

(51) Int. Cl.
*G06K 7/10*    (2006.01)
*G06T 7/10*    (2017.01)
(Continued)

(52) U.S. Cl.
CPC ................ *G06T 7/10* (2017.01); *G06F 30/20* (2020.01); *G06N 3/086* (2013.01); *G06T 2207/20112* (2013.01)

(58) Field of Classification Search
CPC ........ G06Q 10/08; G06Q 10/30; G06Q 50/00; Y10S 83/923; Y10S 83/93; G06N 3/086;
(Continued)

(56) References Cited

U.S. PATENT DOCUMENTS 3,833,796 A * 9/1974 Fetner ................ G06K 9/00127
                                                             382/129
3,919,720 A * 11/1975 Alliston ................ G09B 19/00
                                                             700/23
(Continued)

*Primary Examiner* — Aklilu K Woldemariam
(74) *Attorney, Agent, or Firm* — Muncy, Geissler, Olds & Lowe, P.C.

(57) ABSTRACT

A simulate segmentation method of cylinder and pie cake digital models utilizes a three-dimensional model and a reference point to cope with various shapes of the nuclear reactor structures. The segmentation simulation of the nuclear reactor structure is conducted with genetic algorithm. The segmentation simulation of the nuclear reactor structure is achieved by using the genetic algorithm to perform a double selection mechanism on the cross-sectional area of the nuclear reactor structure to select the optimal configuration of the segmentation, thus minimizing the cross-sectional areas of the nuclear reactor structure. The cutter segments the nuclear reactor structure based on the optimal configuration of the segmentation, thereby achieving the purpose of minimizing the attrition rate of a cutter and segmenting the nuclear reactor structure.

10 Claims, 10 Drawing Sheets

(51) Int. Cl.
*G06N 3/08* (2006.01)
*G06F 30/20* (2020.01)

(58) Field of Classification Search
CPC . G06N 3/126; G06T 2207/20112; G06T 7/10; G06T 7/0012; G06T 7/11; G06T 2207/30024; G06T 7/20; G06T 7/41; G06F 30/20; G06K 9/00127; G06K 9/00147; G06K 9/6296; G06K 9/00248; G06K 9/4604; G06K 9/6256; G01N 21/6458; G01N 15/10; G01N 33/6818; G01N 15/1475; G01N 33/5005; G01N 1/36; G01N 2496/00; G01N 33/54386; G01N 21/00; C12M 41/36; C12M 41/48; C12N 15/102; C12N 15/1034; C12N 15/82; C12N 15/8241; C12Q 1/6881; C12Q 1/6841; C12Q 2545/113; A61B 17/435; Y02W 90/20; G21C 17/00; G21C 17/108; G21D 1/00; Y02E 30/39; H01M 8/004; H01M 8/243
USPC ....... 382/128, 129, 131, 132, 173, 133, 312; 364/578, 923
See application file for complete search history.

(56) References Cited

U.S. PATENT DOCUMENTS

| | | | | |
|---|---|---|---|---|
| 5,936,863 A * | 8/1999 | Kostelnik | ............. | G06Q 10/08 376/260 |
| 6,404,437 B1 * | 6/2002 | Russell, II | ............. | G21D 3/008 345/473 |
| 7,840,357 B2 * | 11/2010 | Kiyuna | ................. | G06T 7/0012 702/19 |
| 8,989,475 B2 * | 3/2015 | Wong | .................... | C12M 41/46 382/133 |
| 2004/0077090 A1 * | 4/2004 | Short | ................. | G01N 33/6818 506/1 |
| 2006/0154234 A1 * | 7/2006 | Winther | ........... | G01N 33/54346 435/4 |
| 2006/0246458 A1 * | 11/2006 | Kiyuna | ................. | G06T 7/0012 435/6.12 |
| 2007/0014452 A1 * | 1/2007 | Suresh | .................... | G06T 17/20 382/128 |
| 2009/0245610 A1 * | 10/2009 | Can | ........................ | G01N 1/312 382/133 |
| 2010/0111396 A1 * | 5/2010 | Boucheron | .......... | G06K 9/6231 382/133 |
| 2011/0103695 A1 * | 5/2011 | Sato | .................... | G06K 9/4604 382/190 |
| 2013/0013282 A1 * | 1/2013 | Takeuchi | ............... | G21D 3/001 703/18 |
| 2013/0083878 A1 * | 4/2013 | Massie | ..................... | G21F 9/28 376/110 |
| 2014/0114630 A1 * | 4/2014 | Brave | .................... | G06F 30/20 703/6 |
| 2015/0081911 A1 * | 3/2015 | Li | .......................... | G06N 3/126 709/226 |
| 2015/0228363 A1 * | 8/2015 | Dewan | .................... | G21C 5/02 376/458 |

\* cited by examiner

SIMULATE SEGMENTATION METHOD OF CYLINDER AND PIE CAKE DIGITAL MODELS

CROSS-REFERENCE TO RELATED APPLICATION

This application claims priority from Taiwan Patent Application No. 107128202, filed on Aug. 13, 2018, in the Taiwan Intellectual Property Office, the disclosures of which are hereby incorporated by reference in their entirety.

BACKGROUND OF THE INVENTION

Field of the Invention

The present invention relates to a simulate segmentation method of a cylinder and pie cake digital models, more particularly to a simulate segmentation method of cylinder and pie cake digital models which uses a genetic algorithm to perform a double selection mechanism to minimize the cross-sectional area of the nuclear reactor structure, thereby achieving the purpose of minimizing the attrition rate of a cutter.

Description of Related Art

Nuclear power plants are important power plants for power supply in a country. The process of generating electricity by nuclear power neither causes air pollution nor emits greenhouse gases such as carbon dioxide, so nuclear power plants have become highly attentive power plants for supplying electricity. However, a devastating earthquake in 2011 in Japan have both caused nuclear problems and raised doubts about the safety of nuclear power plants. Therefore, dismantling nuclear power plants is bound to be an issue that needs to be solved.

For dismantling nuclear power plants, the nuclear reactor should be stored in a suitable location. Due to the restriction of the size of the container and the radiation dose rate, the nuclear reactor structure and the internal components must be segmented to conform to the size of the container. The attrition of a cutter is also a cost to be considered.

The U.S. Pat. No. 5,936,863A has mentioned the segmentation of nuclear reactors, which uses models and databases to select models suitable for the size of a nuclear reactor together with the gradient-based algorithm to simulate segmentation of the cross-sectional area of the nuclear reactor to obtain the minimum cross-sectional area of the nuclear reactor structure. However, the gradient algorithm is used to find the smallest cross-sectional area of the nuclear reactor structure by using an iterative method multiple times. The iterative method is too complicated and time consuming to quickly determine the optimal configuration of the cross-sectional area of the nuclear reactor structure.

In sum, the inventor of the present invention has designed a simulate segmentation method for cylinder and pie cake digital models in order to overcome deficiencies in prior art and enhance the industrial implementation.

SUMMARY OF THE INVENTION

In view of the aforementioned problems, the present invention aims to provide a simulate segmentation method of a cylinder and pie cake digital models to solve the problems encountered in prior art.

Based on the purpose, the present invention provides a simulate segmentation method of a cylinder digital model, which includes: (1) selecting a three-dimensional model and a reference point according to a nuclear reactor structure and obtaining a model height according to a highest point and a lowest point of the three-dimensional model; (2) simulating segmentation of the nuclear reactor structure along a first direction axis to make the nuclear reactor have a cross section at each cutting position, wherein each cross-sectional area of the cross section is obtained by means of the three-dimensional model and the reference point, and a distance between each of the cutting positions is a cutting height; (3) using a genetic algorithm to calculate a cutting information, and the genetic algorithm including: (i) setting a positional chromosome having a first corresponding block corresponding to each of the cutting positions, and each of the first corresponding blocks having the corresponding cutting height; repeatedly generating the positional chromosome until number of the positional chromosome reaches a first constant, wherein the positional chromosome having the first constant is a first initial population; (ii) respectively calculating the sum of the number and the cross-sectional areas of each of the first corresponding blocks of the first initial population as a plurality of first fitness values; (iii) crossing over and mutating each of the positional chromosomes of the first initial population to obtain a plurality of positional abnormal chromosomes, and respectively calculating the sum of the cross-sectional area and the number of the first corresponding blocks of to each of the positional abnormal chromosomes as a first abnormal fitness value; (iv) arranging an order of each of the first fitness values and each of the first abnormal fitness values, and selecting a plurality of first fine chromosomes according to a first selective condition; (v) simulating segmentation of each of the first fine chromosomes at the corresponding cross section to make each of the cross sections have an angular cross section at each cutting angle, wherein the angular cross-sectional area each of the angular cross sections is obtained according to a thickness of the surface and a center of the surface, and a difference value between each of the cutting angles is an angular difference; (vi) setting a second corresponding block of an angular chromosome corresponding to each of the cutting angles and each of the second corresponding blocks having the corresponding angular difference; repeatedly generating the angular chromosome until number of angular chromosomes reaches a second constant, wherein and the angular chromosomes with the second constant is a second initial population; (vii) respectively calculating a sum of the angular cross-sectional areas and the number of the second corresponding blocks corresponding to the second initial population as a plurality of second fitness values; (viii) crossing over and mutating each of the angular chromosomes of the second initial population to obtain a plurality of angular abnormal chromosomes, and respectively calculating the sum of the angular cross-sectional areas and the number of the second corresponding blocks corresponding to each of the angular abnormal chromosomes as a second abnormal fitness value; (ix) arranging an order of each of the second fitness values and each of the second abnormal fitness values, and selecting a plurality of second fine chromosomes according to a second selective condition; (x) repeatedly operating the genetic algorithm until an optimal chromosome is selected and each of the cutting positions and each of the angles corresponding to the optimal chromosome are integrated as the cutting information; and (4) segmenting the nuclear reactor structure according to the cutting information. Through the double selection mechanism of the cross-sectional area, models, and angles operated by the genetic algorithm, the cutting area of the nuclear reactor structure may be optimized, and the attrition of the cutter may be reduced when cutting the nuclear reactor structure according to the cutting information.

Preferably, when the sum of the cutting height of the positional chromosome is higher than the model height, the cutting height is adjusted to be equal to the model height and remaining values of the first corresponding blocks are equal to zero, thus smoothly performing the operation of the genetic algorithm.

Preferably, when the sum of the angular difference of the angular chromosome is larger than 360 degrees, the sum of the angular difference is adjusted to 360 degrees and remaining values of the second corresponding blocks is equal to zero, thus smoothly performing the operation of the genetic algorithm.

Preferably, the first selective condition is to select a few of the positional chromosomes and the positional abnormal chromosomes with smaller fitness values as the plurality of first fine chromosomes from the positional chromosomes and the positional abnormal chromosomes, and the number of the plurality of first fine chromosomes is the first constant.

Preferably, the second selective condition is to select a few of the angular chromosomes and the angular abnormal chromosomes with smaller fitness values as the plurality of second fine chromosomes from the angular chromosomes and the angular abnormal chromosomes, and the number of the plurality of second fine chromosomes is the second constant.

Based on the purpose, the present invention provides a simulate segmentation method of a cylinder digital model, which includes: (1) selecting a three-dimensional model and a reference point according to a nuclear reactor structure, and obtaining a model height and a model width according to a highest point and a lowest point of the three-dimensional model on a first direction axis and a second direction axis; (2) simulating segmentation of the nuclear reactor along the first direction axis to make the nuclear reactor have a first cross section at each first cutting position, wherein a first cross-sectional area each of the first cross section is obtained by means of the three-dimensional model and the reference point, and a distance between each of the first cutting positions is a first cutting height; (3) using a genetic algorithm to calculate a cutting information, and the genetic algorithm including: (i) setting a first positional chromosome having a first corresponding block corresponding to each of the first cutting positions, and each of the first corresponding blocks having the corresponding first cutting height; repeatedly generating the first positional chromosome until number of the first positional chromosome reaches a first constant, wherein the first positional chromosome having the first constant is a first initial population; (ii) calculating a sum of the cross-sectional areas and the number of each of the first corresponding blocks of the first initial population as a plurality of the first fitness values; (iii) crossing over and mutating each of the first positional chromosomes of the first initial population to obtain a plurality of first positional abnormal chromosomes, and calculating the number and the cross-sectional areas of the first corresponding blocks of each of the first positional abnormal chromosomes as a first abnormal adaptive value; (iv) arranging an order of each of the first fitness values and each of the first abnormal fitness values, and selecting a plurality of first fine chromosomes according to a first selective condition; (iv) simulating segmentation of the first fine chromosomes along a second direction axis to make each of the first fine chromosomes have a second cross section at each of the second cutting positions, wherein the second cross-sectional area of each of the second cross sections is obtained by means of the three-dimensional model and the reference point, and a distance between each of the second cutting positions is a cutting height; (vi) setting a second corresponding block of a second positional chromosome corresponding to each of the second cutting positions, and each of the second corresponding blocks having the corresponding cutting width; repeatedly generating the second positional chromosome until number of the second positional chromosome reaches a second constant, wherein the second positional chromosome with the second constant is a second initial population; (vii) calculating a sum of the second cross-sectional area and the number of the second corresponding blocks of the second initial population as a plurality of second fitness values; (vii) crossing over and mutating each of the second positional chromosomes of the second initial population to obtain a plurality of second positional abnormal chromosomes, and calculating the sum of the cross section area and the number of the second corresponding blocks of each of the second positional abnormal chromosomes as a second abnormal adaptive value; (ix) arranging an order of each of the second fitness values and each of the second abnormal fitness values, and selecting a plurality of second fine chromosomes according to a second selective condition; (x) repeatedly calculating the genetic algorithm until an optimal chromosome is selected and each of the first cutting positions and each of the second cutting positions corresponding to the optimal chromosome is a cutting information; and (4) segmenting the nuclear reactor structure according to the cutting information. Through the double selection mechanism of the cross-sectional area, models, and angles calculated by the genetic algorithm, the cutting area of the nuclear reactor structure may be optimized, and the attrition of the cutter may be reduced when cutting the nuclear reactor structure according to the cutting information.

Preferably, when the sum of the first cutting height of the first positional chromosome is higher than the model height, the cutting height is adjusted to be equal to the model height, and remaining values of the first corresponding blocks are equal to zero to smoothly perform the operation of the genetic algorithm.

Preferably, when the sum of the cutting width of the second positional chromosome is greater than the model width, the cutting height is adjusted to be equal to the model width, and remaining values of the second corresponding blocks are zero.

Preferably, the first selective condition is to select a few of the first positional chromosomes and the first positional abnormal chromosomes with smaller fitness values as the plurality of first fine chromosomes from the first positional chromosomes and the first positional abnormal chromosomes, and the number of the plurality of first fine chromosomes is the first constant.

Preferably, the second selective condition is to select a few of the second positional chromosomes and the second positional abnormal chromosomes with smaller fitness values as the plurality of second fine chromosomes from the second positional chromosomes and the second positional abnormal chromosomes, and the number of the plurality of second fine chromosomes is the second constant.

Accordingly, the simulate segmentation method of cylinder and pie cake digital models of the present invention is performed to obtain the optimal configuration of the segmentation of the nuclear reactor structure though the double selection mechanism on the cross-sectional area by the genetic algorithm. This may minimize the cutting area of the nuclear reactor structure and lower the attrition rate of a cutter.

DESCRIPTION OF THE PREFERRED EMBODIMENTS

The advantages, features, and technical methods of the present invention are explained in more detail with reference to the exemplary embodiments and the drawings. Moreover, the present invention may be realized in different forms and should not be construed as the embodiments limited herein. On the contrary, for those of ordinary skill in the art, the embodiments provided will help convey the scope of the present invention more thoroughly, comprehensively, and completely. Furthermore, the present invention will be defined only by the scope of the appended claims.

Figure 1:
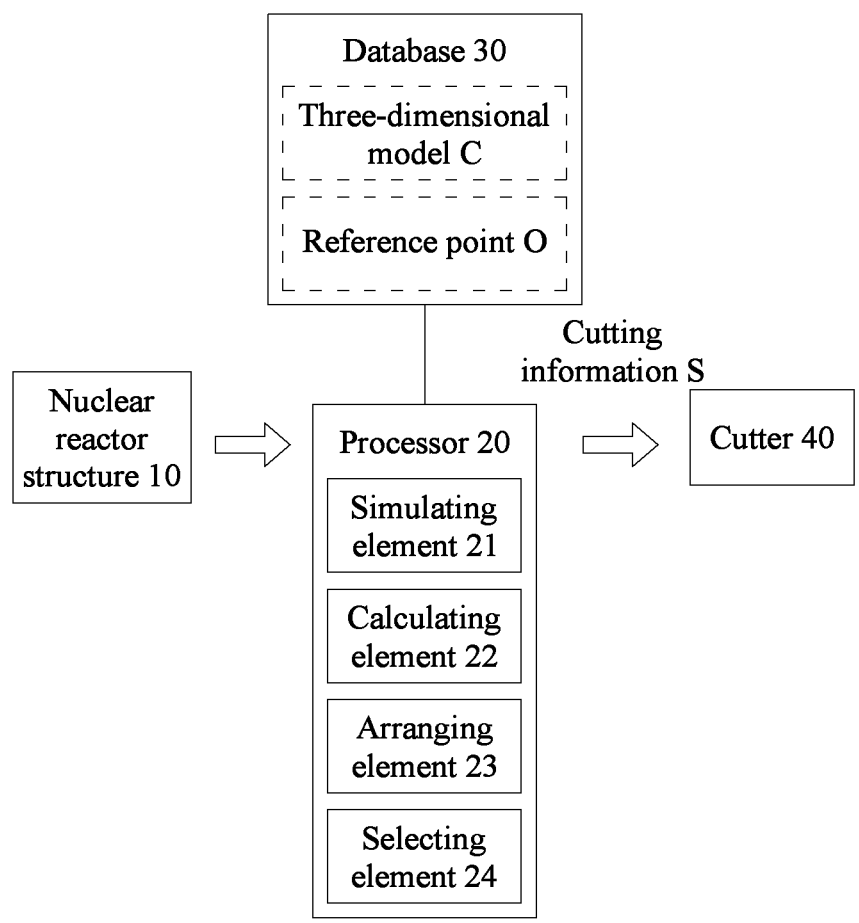
FIG. 1 is a block diagram of the simulate segmentation method of the cylinder digital model according to the embodiment of the present invention.

Please refer to FIG. 1, which depicts a block diagram of the simulate segmentation method of the cylinder digital model according to the embodiment of the present invention. As shown in FIG. 1, the devices required for the simulate segmentation method of the cylinder digital model of the present invention include a nuclear reactor structure 10, a processor 20, a database 30, and a cutter 40. The database 30 has a variety of three-dimensional models C and reference points O. The processor 20 selects an appropriate three-dimensional model C and reference point O in the database 30 according to the input nuclear reactor structure 10, and the processor 20 includes a simulating element 21, a calculating element 22, an arranging element 23, and a selecting element 24. The aforementioned elements are elements required for the calculation of the genetic algorithm, and the related description of the algorithmic algorithm is described below. The processor 20 outputs the cutting information S after the operation of the genetic algorithm. The cutter 40 cuts the nuclear reactor structure 10 according to the cutting information S.

Figure 2:
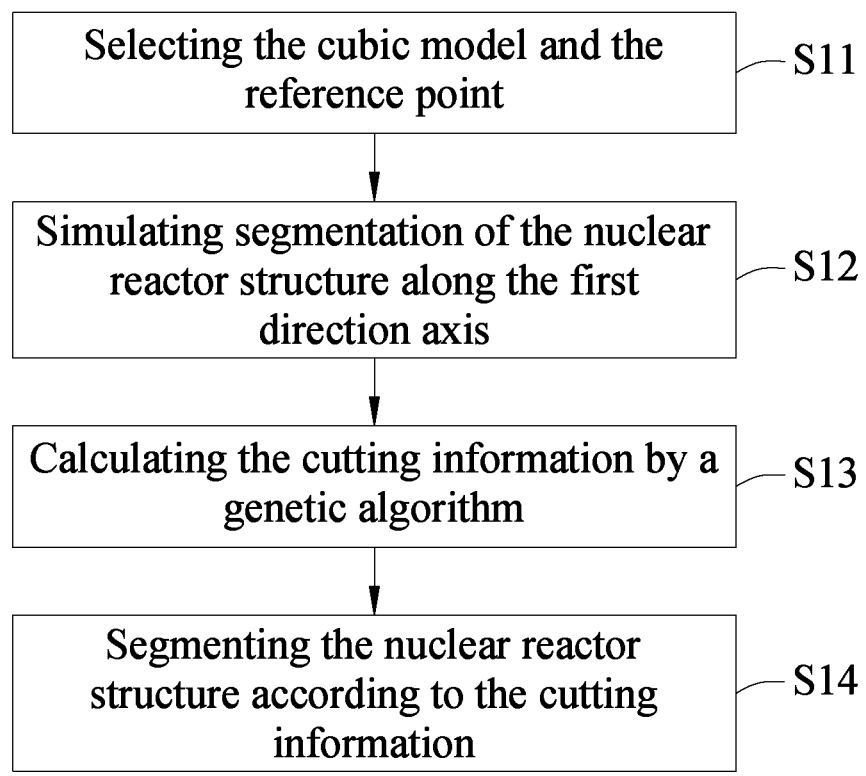
FIG. 2 is a flow chart of the simulate segmentation method of the cylinder digital model according to the embodiment of the present invention.

Please refer to FIG. 2, which depicts a flow chart of the simulate segmentation method of the cylinder digital model according to the embodiment of the present invention. In this embodiment, the simulate segmentation method of the cylinder digital model of the present invention includes: (1) S11 step: The processor 20 selects the three-dimensional model C and the reference point O in the database 30 according to the nuclear reactor structure 10; the surface of the three-dimensional model C is represented by a large number of triangles; the processor 20 obtains the model height according to the highest point and the lowest point of the three-dimensional model C; different nuclear reactor structures 10 use different three-dimensional models C; different nuclear reactor structures 10 correspond to different reference points O; (2) S12 step: The simulating element 21 simulates segmentation of the nuclear reactor structure 10 along the first direction axis such that the nuclear reactor structure 10 has a cross section at each cutting position; the simulating element 21 uses the maximum distance and the minimum distance between the triangular of the three-dimensional model C and the reference point O to obtain the cross-sectional area of each of the cross section; the distance between each cutting position is the cutting height; (3) S13 step: The processor 20 operates the cutting information S by a genetic algorithm; the genetic algorithm will be described as follows; (4) S14 step: The cutter 40 segments the nuclear reactor structure 10 according to the cutting information S; the segmented nuclear reactor structure 10 will be placed in a container. Through the method of the present invention, the segmentation of the related elements such as the nuclear reactor structure 10 of the top guide and the core shroud is simulated, which optimizes the segmentation configuration of the elements of the nuclear reactor structure 10, thereby reducing the attrition rate of the cutter 40.

Figure 3:
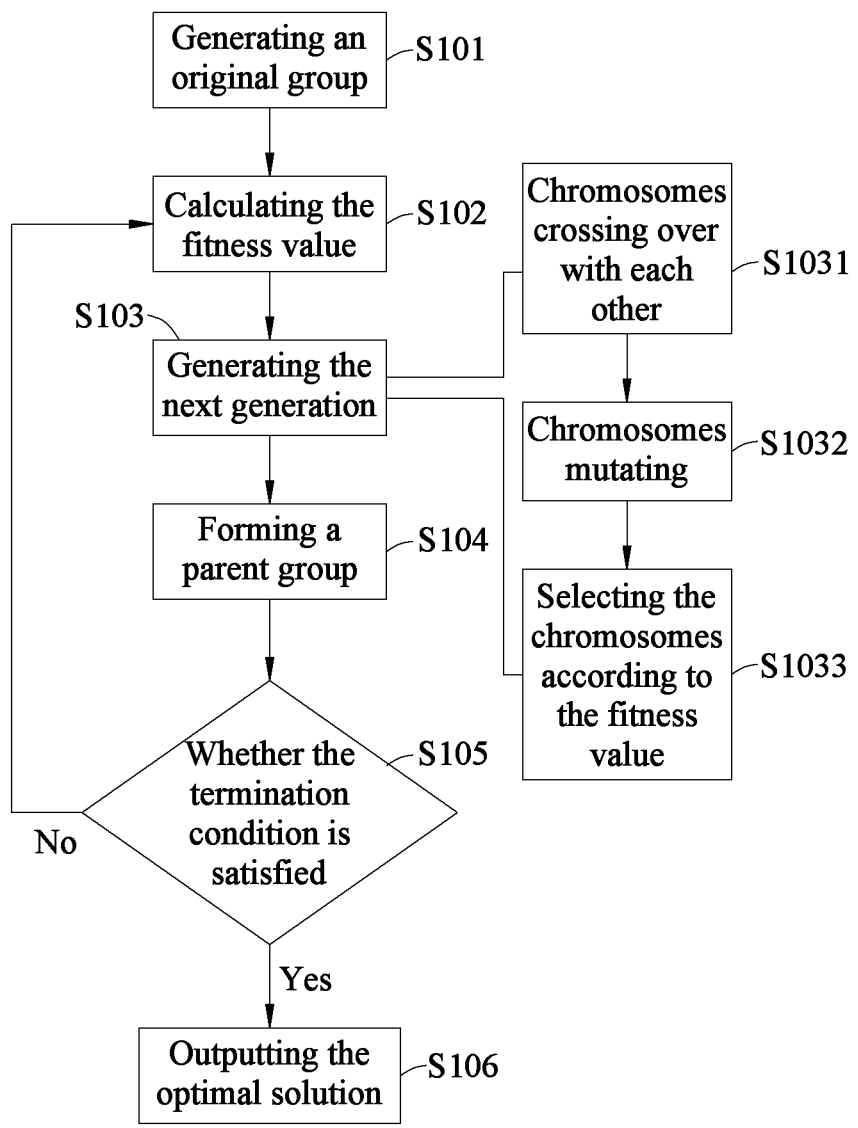
FIG. 3 is a flow chart of the genetic algorithm.

Please refer to FIG. 3, which depicts a flow chart of the genetic algorithm. As shown in FIG. 3, the entire procedure of the genetic algorithm is shown as follows: (1) S101 step: Generating the amount of the chromosomes to a certain number to form an initial population; (2) S102 step: Calculating the fitness value of each of the chromosomes in the initial population, wherein the fitness value determines the ability of each of the chromosomes to adapt to the environment; (3) S103 step: Generating the next generation which includes the following sub steps: (i) S1031 step: Each of the chromosomes crossing over each other; (ii) S1032 step: Each of the chromosomes mutating when crossing over, integrating the chromosomes after crossing over and mutating as a plurality of abnormal chromosome, and calculating the fitness value of each of the abnormal chromosome; (iii) S1033 step: Arranging the fitness values of each of the chromosomes and each of the abnormal chromosomes; selecting the chromosomes according to the fitness value; eliminating the chromosomes with smaller fitness values in the initial population and the plurality of abnormal chromosomes; (4) S104 step: Leaving the chromosomes with a higher fitness values as a parent group; (5) S105 step: Proceeding to S106 when the termination condition is satisfied; restart calculating the fitness value when the termination condition is not satisfied; repeating the aforementioned procedure until the optimal solution is outputted; (6) S106 step: Outputting the optimal solution (the optimal chromosome), wherein the termination condition is to obtain the optimal solution, such as how many generations are evolved by the initial population and the chromosome fitness values of multiple generations being the same. For example, the chromosomes stop evolving at the 800th generation; the number of generations may be set according to actual demands. The fitness values being the same mean that the fitness value of each of the chromosomes begins to converge, and no genetic algorithm is required.

Figure 4:
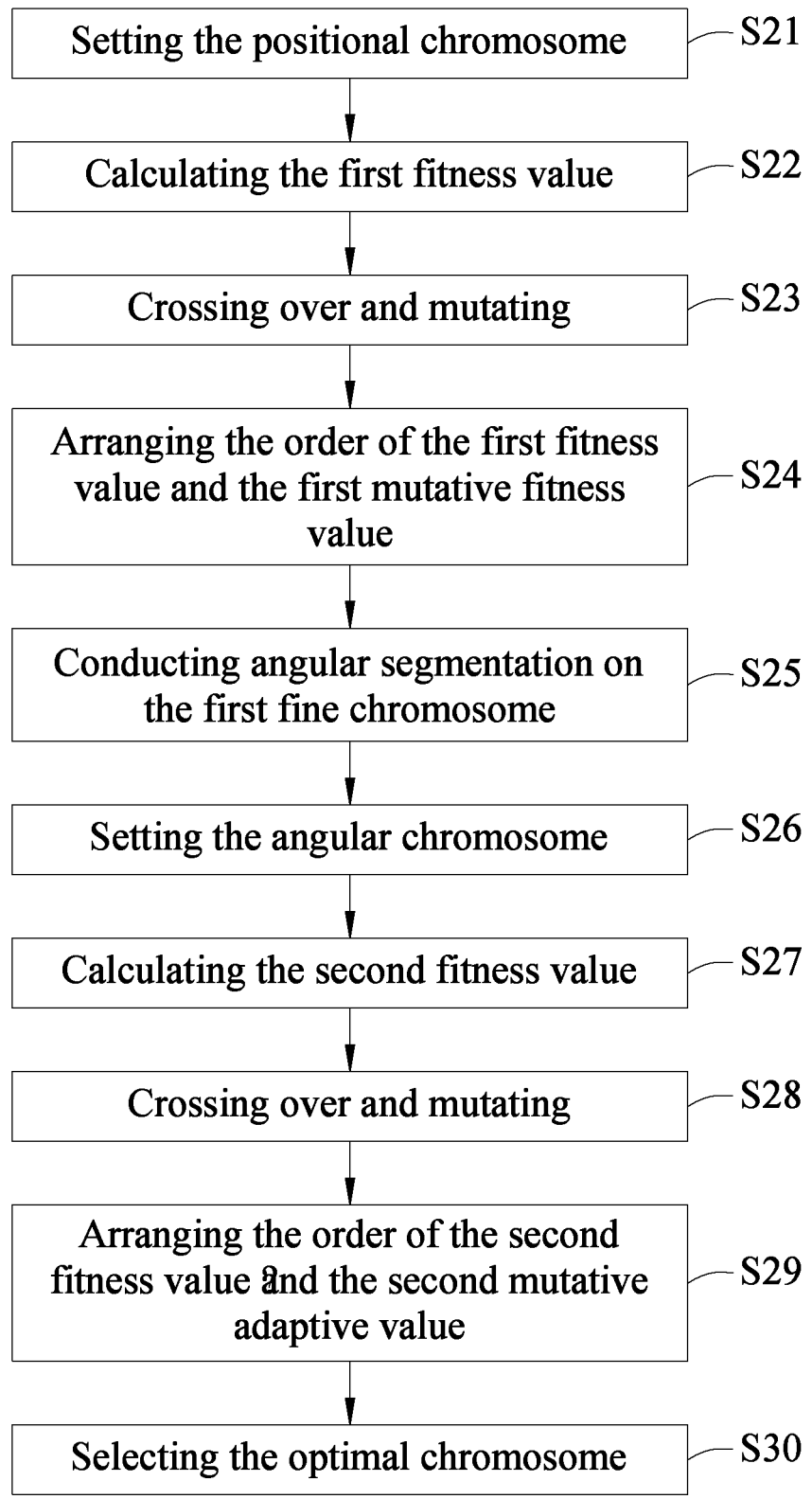
FIG. 4 is a flow chart of the genetic algorithm of the simulate segmentation method of the cylinder digital model according to the embodiment of the present invention.
Figure 5:
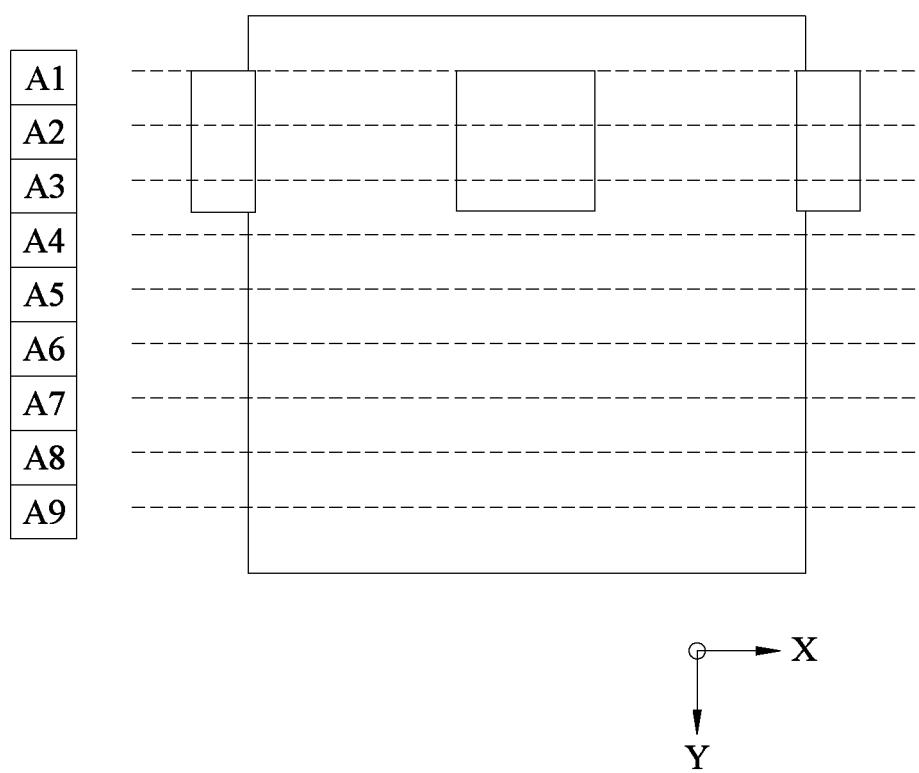
FIG. 5 is a schematic diagram of the x-z cross-sectional area segmentation of the genetic algorithm of the simulate segmentation method of the cylinder digital model according to the embodiment of the present invention.
Figure 6:
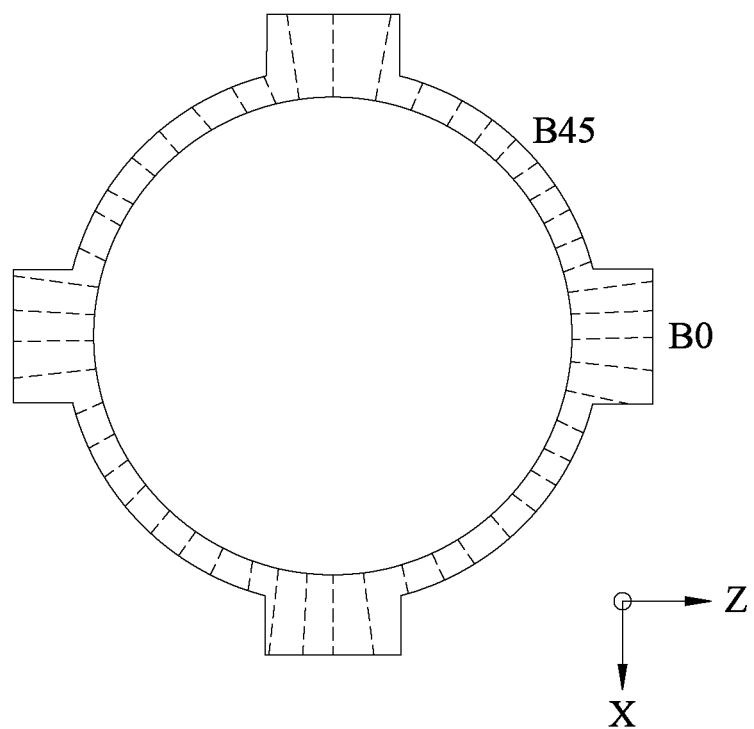
FIG. 6 is a schematic diagram of the angle segmentation of the genetic algorithm of the simulate segmentation method of the cylinder digital model according to the embodiment of the present invention.

Please refer to FIG. 4, FIG. 5, and FIG. 6, which depict a flow chart of the genetic algorithm of the simulate segmentation method of the cylinder digital model according to the embodiment of the present invention, schematic diagram of the x-z cross-sectional area segmentation of the genetic algorithm of the simulate segmentation method of the cylinder digital model according to the embodiment of the present invention, and a schematic diagram of the angle segmentation of the genetic algorithm of the simulate segmentation method of the cylinder digital model according to the embodiment of the present invention. As shown in FIG. 4, FIG. 5, and FIG. 6, the steps of applying the genetic algorithm to obtain the cutting information S with the setup of the first direction axis as the y axis and each cross section being on the x-z plane include: (i) S21 step: The simulating element 21 sets the positional chromosome to have a first corresponding block corresponding to each cutting position; each of the first corresponding blocks has a corresponding cutting height; the simulating element 21 repeatedly generates the positional chromosome until the number of the positional chromosomes reaches the first constant; the positional chromosome with the first constant is the first initial population; each of the positional chromosomes of the first initial population corresponds to different cutting positions and different cutting heights; it should be noted that each cutting position is a position on the y axis and each of the cross-sectional areas (x-z cross-sectional areas) is denoted as A1 to A9; the value of the first constant may be 8 or 10; the values of the cutting location and the first constant may be adjusted according to actual demands, which is not limited to the scope of the present invention; (ii) S22 step: The calculating element 22 calculates the sum of the cross-sectional area and the number of each of the first corresponding blocks of the first initial population as a plurality of first fitness values; (iii) S23 step: The simulating element 21 crosses over and mutates each of the first positional chromosomes in the first initial population to obtain a plurality of first abnormal chromosomes; The first corresponding blocks and the cutting height of the plurality of positional abnormal chromosomes differ from the first corresponding block and the cutting height of the first initial population; that is, the cutting position of the plurality of positional abnormal chromosomes is different from the cutting position of the first initial population; the calculating element 22 calculates the sum of the cross-sectional areas and the number of the first corresponding blocks of each positional abnormal chromosome as the first abnormal fitness value; (iv) S24 step: The arranging element 23 arranges the order of each of the first fitness values and each of the first abnormal fitness values; the selecting element 24 selects the plurality of first fine chromosomes according to the first selective condition; (v) S25 step: The simulating element 21 simulates the segmentation of the cross section of each of the first fine chromosomes to make each cross section have an angular section B0 to B359 at each cutting angle; the angle cross-sectional area of each angular section is obtained according to the thickness of the surface and the maximum and minimum value between each angular section and the center of the surface; the difference between each cutting angle is the angle difference; it should be noted that the angular section B0 to B359 are cut every one degree; the cutting angle may be adjusted according to actual demand as long as the cutting angle is not greater than the maximum cutting angle θ; (vi) S26 step: The simulating element 21 sets the angular chromosome to have a second corresponding block corresponding to each cutting angle; each second corresponding block has a corresponding angular difference; the angular chromosome is repeatedly generated until the number of angular chromosomes reaches a second constant; the angular chromosomes having the second constant is the second initial population, wherein the second constant is less than the first constant, the value of the second constant may be 6 or 4, and the value of second constant may be adjusted according to actual demands, which is not limited to the scope of the present invention; (vii) S27 step: The calculating element 22 calculates the sum of the angular cross-sectional areas and the number of the second corresponding blocks of the second initial population as a plurality of second fitness values; (viii) S28 step: The simulating element 21 crosses over and mutates each of the angular chromosomes of the second initial population to obtain a plurality of angular abnormal chromosomes; the cutting angle of the plurality of angular abnormal chromosomes differs from the cutting angle of the second initial population; the sum of the angular cross-sectional area and the number of the second corresponding blocks of each angular abnormal chromosome is calculated as a second abnormal adaptive value; (ix) S29: The arranging element 23 arranges the order of each of the second fitness values and each of the second abnormal fitness values, and the selecting element 24 selects the plurality of second fine chromosomes according to the second selective condition; (x) S30: The selecting element 24 repeats the operation of the genetic algorithm until the optimal chromosome is selected and each cutting position and each angle corresponding to the optimal chromosome are integrated as the cutting information S. Through the double selection mechanism of the cross-sectional area, the match of the three-dimensional model and the angle by the genetic algorithm, the cross-sectional area of the nuclear reactor structure 10 may be optimized. The fitness value is used for arrangement instead of using the iterative method, thus reducing the need for calculation. The attrition rate of the cutter 40 may be reduced when segmenting the nuclear reactor structure 10 in accordance with the cutting information S.

Wherein, the first selective condition is to select a few of the positional chromosomes and the positional abnormal chromosomes with smaller fitness values as the plurality of first fine chromosomes from the positional chromosomes and the positional abnormal chromosomes, and the number of the plurality of first fine chromosomes is the first constant. When the selecting element 24 is unable to find an optimal plurality of first fine chromosomes, the evolution of the first initial population stops at the 800th generation. The second selective condition is to select a few of the angular chromosomes and the angular abnormal chromosomes with smaller fitness values as the plurality of second fine chromosomes from the angular chromosomes and the angular abnormal chromosomes, and the number of the plurality of second fine chromosomes is the second constant. When the selecting element 24 is unable to find an optimal plurality of second fine chromosomes, the evolution of second initial population stops at the 800th generation. The maximum cutting angle θ is obtained from the length of the container (θ e2 sin$^{-1}$ (l/r), wherein l is the length of the container, and r is the curvature radius of the container).

It is worth mentioning that when the sum of the cutting height of the positional chromosome is greater than the model height, the cutting height is adjusted to be equal to the model height, and the remaining values of the first corresponding blocks are zero; when the sum of the angular difference of the angular chromosome is greater than 360 degrees, the angular difference is adjusted to be equal to 360 degrees, and the remaining values of the second corresponding blocks are zero, thus smoothly performing the operation of the genetic algorithm.

In addition, the purpose of crossing over and mutating the first positional chromosome of the first initial population is to produce a plurality of the first positional abnormal chromosomes. The plurality of positional abnormal chromosomes have the first corresponding blocks and the cutting height which differ those of the first initial population, therefore diversifying the configuration of the cutting position without being limited to the cutting position of the first initial population. The purpose of crossing over and mutating each of the angular chromosomes of the second initial population is to obtain a plurality of the positional abnormal chromosomes. The plurality of positional abnormal chromosomes have the second corresponding blocks and the cutting angle which differ from those of the second initial population without being limited to the cutting angle of the second initial population.

Figure 7:
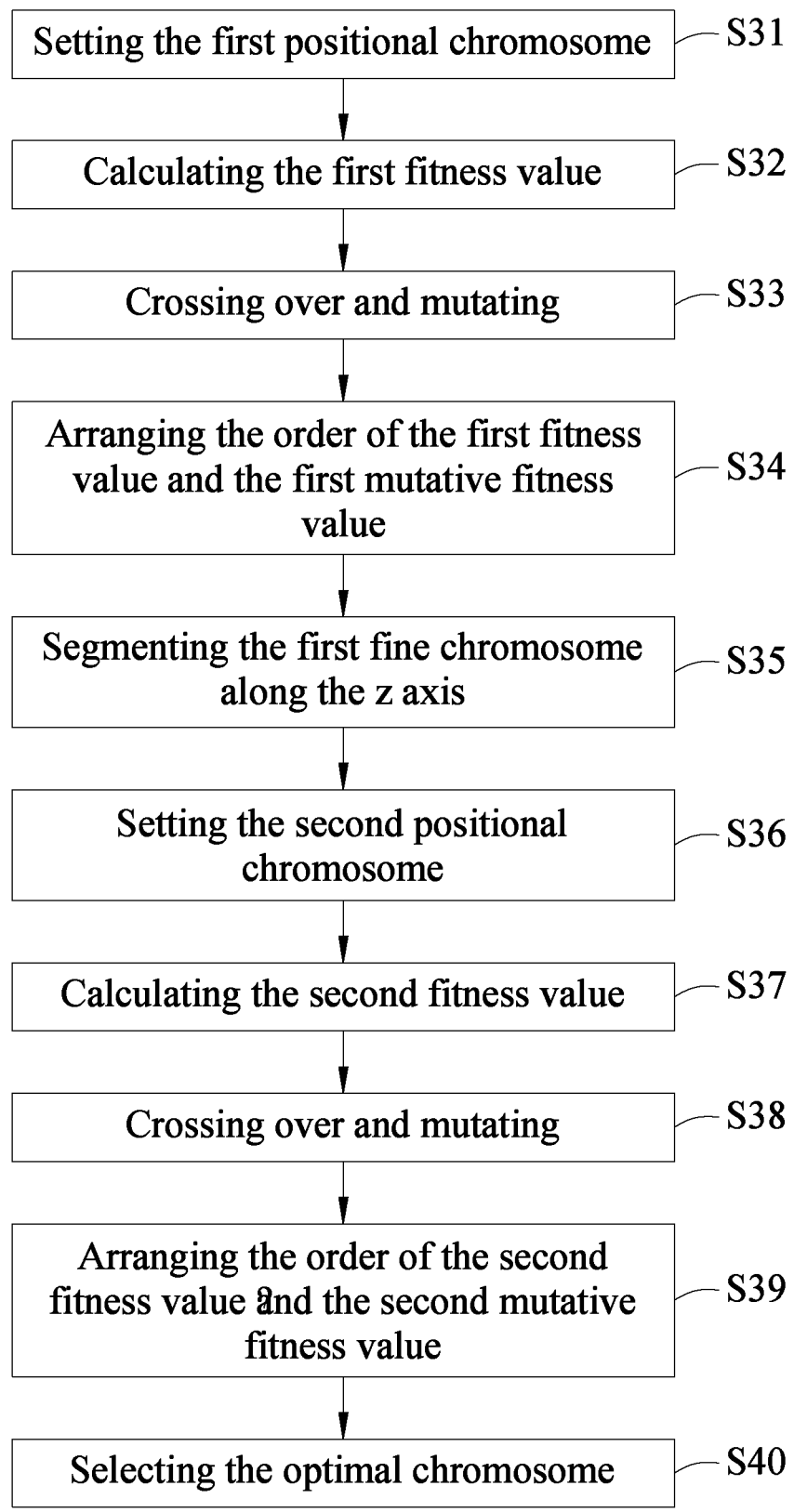
FIG. 7 is a flow chart of the genetic algorithm of the simulate segmentation method of the pie cake digital model according to the embodiment of the present invention.
Figure 8:
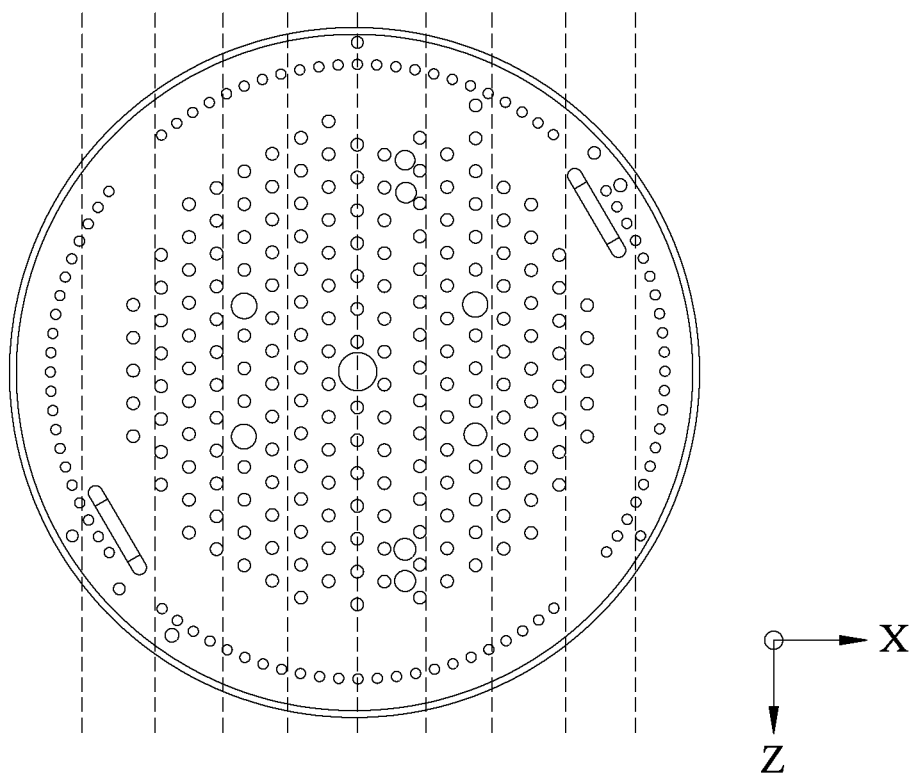
FIG. 8 is a schematic diagram of the y-z cross-sectional area segmentation of the genetic algorithm of the simulate segmentation method of the pie cake digital model according to the embodiment of the present invention.
Figure 9:
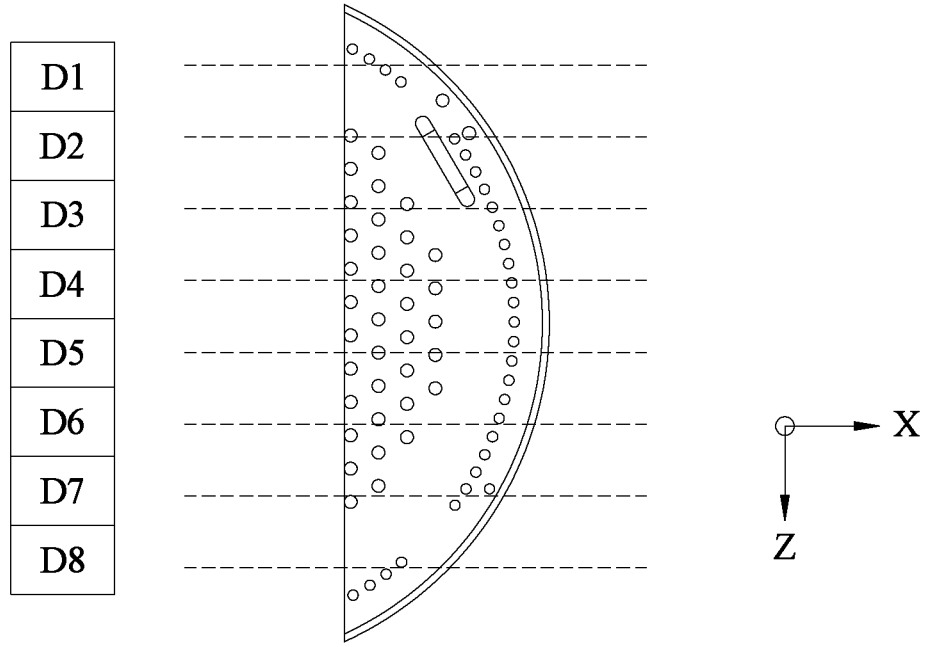
FIG. 9 is a schematic diagram of the x-y cross-sectional area segmentation of the genetic algorithm of the simulate segmentation method of the pie cake digital model according to the embodiment of the present invention.

Please refer to FIG. 7, FIG. 8, and FIG. 9 which depicts a flow chart of the genetic algorithm of the simulate segmentation method of the pie cake digital model according to the embodiment of the present invention, a schematic diagram of the y-z cross-sectional area segmentation of the genetic algorithm of the simulate segmentation method of the pie cake digital model according to the embodiment of the present invention, and a schematic diagram of the x-y cross-sectional area segmentation of the genetic algorithm of the simulate segmentation method of the pie cake digital model according to the embodiment of the present invention. In this embodiment, the configurations of the elements with the same symbols are similar to those in the aforementioned descriptions and thus similar descriptions will be omitted.

Herein, the differences between the simulate segmentation method of the cylinder digital model and the simulate segmentation method of the pie cake digital model are firstly explained. The difference is S11 step in FIG. 1, which illustrates: The processor 20 selects the three-dimensional model C and the reference point O in the database 30 according to the nuclear reactor structure 10. The processor 20 obtains the model height and the model width according to the highest point and the lowest point of the three-dimensional model in the first direction axis and the second direction axis. The rest of the overall procedure is as shown in FIG. 1.

As shown in FIG. 7, FIG. 8, and FIG. 9, the differences between the simulate segmentation method of the cylinder digital model and the simulate segmentation method of the pie cake digital model of the present invention are S11 in FIG. 1 and the cross-sectional area obtained by the genetic algorithm. The steps of applying the genetic algorithm of the simulate segmentation method of the pie cake digital model to obtain the cutting information S with the setup of the first direction axis as the x axis, each first cross section being on the y-z plane, the second direction axis as the z axis, and each second cross section being on the x-y plane include: (i) S31 step: The simulating element 21 sets the first positional chromosome to have a first corresponding block corresponding to each of the first cutting positions; each of the first corresponding blocks has the corresponding cutting height; the simulating element 21 repeatedly generates the first positional chromosome until the number of the first positional chromosome reaches a first constant; the first positional chromosome with the first constant is a first initial population; it should be noted that each of the first cutting positions is a position on the x-axis, each of the first cross-sectional areas (y-z cross-sectional areas) is denoted by C1 to C9, the values of the first constant may be 8 or 10, and the values of the first cutting positions and the first constant may be adjusted according to actual demands, which are not limited to the scope of the present invention; (ii) S32 step: The calculating element 22 calculates the sum of the cross-sectional area and the number of each of the first corresponding blocks of the first initial population as a plurality of first fitness values; (iii) S33 step: The simulating element 21 crosses over and mutates each of the first positional chromosomes of the first initial population to obtain a plurality of the first positional abnormal chromosomes; the first cutting position of the plurality of first positional abnormal chromosomes differs from the first cutting position of the first initial population; the calculating element 22 calculates the sum of the cross-sectional area and the number of the first corresponding blocks of each of the first positional abnormal chromosomes as a first abnormal fitness value. Since the first direction axes of the simulate segmentation methods of the cylinder digital model and the pie cake digital model of the present invention differ from each other, the first fitness values and the first abnormal fitness values of the simulate segmentation methods of the cylinder digital model and the pie cake digital model of the present invention also differ from each other; (iv) S34 step: The arranging element 23 arranges the order of each of the first fitness values and each of the first abnormal fitness values; the selecting element 24 selects the plurality of first fine chromosomes according to the first selective condition; (v) S35 step: The simulating element 21 segments each of the first fine chromosomes along the z axis, making each of the first fine chromosomes have a second cross section at each of the second cutting positions; the second cross-sectional area D1 to D9 (x-y cross-sectional area) of the second cross section is obtained by means of the three-dimensional model C and the reference point O; the distance between each of the second cutting locations is the cutting width; the number of second cutting positions may be adjusted according to actual demands which is not limited to the scope of the present invention; (vi) S36 step: The simulating element 21 sets the second positional chromosome to have the second corresponding block corresponding to each of the second cutting positions; each of the second corresponding blocks has the corresponding cutting width; the second positional chromosome is repeatedly generated until the number of the second positional chromosome reaches the second constant; the second positional chromosome with the second constant is the second initial population. Wherein, the second constant is less than the first constant, and the second constant may be 6 or 4; the second constant may be adjusted according the actual demands; (vii) S37 step: The calculating element 22 calculates the sum of the second cross-sectional area and the number of the second corresponding blocks of the second initial population as a plurality of second fitness values; (viii) S38 step: The simulating elements 21 crosses over and mutates the second positional chromosome of the second initial population to obtain a plurality of second positional abnormal chromosome; the calculating element 22 calculates the sum of the second cross-sectional area and the number of the second corresponding blocks of each of the second positional abnormal chromosomes as a second abnormal fitness value; (ix) S39 step: The arranging element 23 arranges the order of each of the second fitness values and the second abnormal fitness values; the selecting element 24 selects the plurality of second fine chromosomes according to the second selective condition; (x) S40 step: The selecting element 24 repeatedly operates the genetic algorithm until an optimal chromosome is selected and each of the first cutting positions and each of the second cutting positions corresponding to the optimal chromosome are integrated as the cutting information S. Through the double selection mechanism of the cross-sectional area by the genetic algorithm, the cutting area of the nuclear reactor structure 10 is optimized. The attrition rate of the cutter 40 may be reduced when segmenting the nuclear reactor structure 10 in accordance with the cutting information S.

Similarly, the first selective condition is to select a few of the positional chromosomes and the positional abnormal chromosomes with smaller fitness values as the plurality of first fine chromosomes from the first positional chromosomes and the first positional abnormal chromosomes, and the number of the plurality of first fine chromosomes is the first constant. When the selecting element 24 is unable to find an optimal plurality of first fine chromosomes, the evolution of the first initial population stops at 800th generation. The second selective condition is to select a few of the second chromosomes and the second abnormal chromosomes with smaller fitness values as the plurality of the second fine chromosomes from the second chromosomes and the second abnormal chromosomes, and the number of the plurality of second fine chromosomes is the second constant. When the selecting element 24 is unable to find an optimal plurality of the second fine chromosomes, the evolution of second initial population stops at 800 generations.

It is worth mentioning that when the sum of the first cutting height of the first positional chromosome is higher than the model height, the cutting height is adjusted to be equal to the model height, and the remaining values of the first corresponding blocks are zero; when the sum of the cutting width of the second positional chromosome is greater than the model width, the cutting width is adjusted to be equal to the model width, and the remaining values of the second corresponding blocks are zero, thus smoothly performing the operation of the genetic algorithm.

In addition, the purposes of crossing over and mutating each of the second positional chromosomes of the second initial population and crossing over and mutating each of the first positional chromosomes of the first initial population both diversify the cutting position and the configuration of the optimal chromosome. Through the collocation of the crossing over, mutating, and selecting methods, the configuration of the inappropriate cutting position may be eliminated, and the configuration of the appropriate cutting position is retained. Through continuous elimination and retention, the optimal cutting information S is selected, thus minimizing the attrition rate of the cutter 40.

It is worth mentioning that the simulate segmentation method of the pie cake digital model may be applied to wafer segmentation. The description is illustrated together with FIG. 7 and FIG. 1 as follows: (1) The processor 20 selects an appropriate three-dimensional model C and reference point O according to the shape of the wafer and uses a large number of spatial triangles to represent the three-dimensional model C; the simulating element 21 simulates the segmentation of the three-dimensional model C along the x axis and has a y-z cross section at each first cutting position; the simulating element 21 uses the maximum and minimum values between the triangle of the three-dimensional model C and the reference point O to obtain the y-z cross-sectional area of each y-z section; the distance between each first cutting position is the first cutting height; (2) The simulating element 21, the calculating element 22, the arranging element 23, and the selecting element 24 use the genetic algorithm to perform the first selection to obtain the first cutting information simulated on the x axis; (3) The simulating element 21 simulates the segmentation on the wafer based on the first cutting information, simulates the segmentation of the three-dimensional model C along the z axis, and has an x-y cross section at each second cutting position; the simulating element 21 further uses the maximum and minimum values between the triangle of the three-dimensional model C and the reference point O to obtain the x-y cross-sectional area of each x-y cross section; the distance between each second cutting position is the second cutting height; (4) The simulating element 21, the calculating element 22, the arranging element 23, and the selecting element 24 use the genetic algorithm to perform the second selection on the z axis to obtain the second cutting information simulated; (5) The first cutting position and the second cutting position corresponding to the first cutting information and the second cutting information are integrated; then a wafer cutting device is further used to segmented the wafer according to the first cutting position and the second cutting position, and the wafer is appropriately segmented to an appropriate size.

It is noted that the simulate segmentation methods of the cylinder digital model and the pie cake digital model are separately applied to the segmentation of different parts of the nuclear reactor. For example, the simulate segmentation method of the pie cake digital model is used to segment the internal pipes of the nuclear reactor, whereas the simulate simulation method of the cylinder digital model is to used cut the external pipes of the nuclear reactor. Different simulate segmentation methods may be used according to the actual parts of the nuclear reactor. In addition, the genetic algorithm of the aforementioned embodiment is performed on Visual Studio®, and the three-dimensional model C is a model in Solid Works®. Moreover, Visual Studio® may be used to automatically simulate the segmentation of the nuclear reactor in Solid Works® according to the cutting information S, which allows engineer to understand whether the configuration of the cutting information S is suitable.

Continuously, with SolidWorks® API interface, SolidWorks® VBA, Macro, and Visual Studio®, the segmentation may be simulated automatically according to the cutting information S in Solid Works®, making the segmentation simulation process more convenient. Visual Studio® may be used to adjust the parameters of the cutting information S properly so that the situation of the segmentation simulation may be instantly known. The engineer may also manually simulate the segmentation in SolidWorks® according to the cutting information S and adjust the parameters of the cutting information S.

Figure 10:
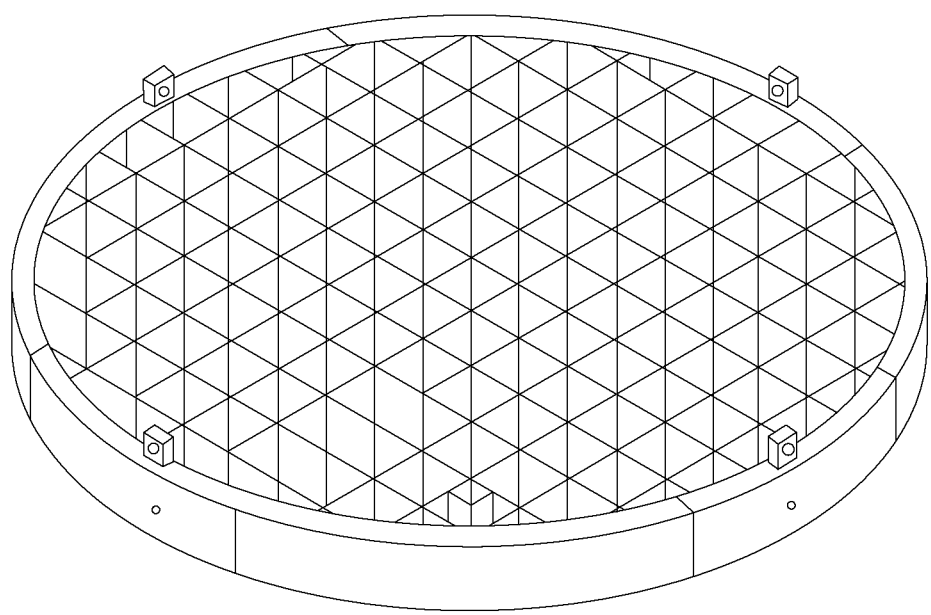
FIG. 10 is a schematic diagram of the nuclear reactor structure of the simulate segmentation method of the pie cake digital model according to the embodiment of the present invention.

Please refer to FIG. 10, which depicts a schematic diagram of the nuclear reactor structure of the simulate segmentation method of the pie cake digital model according to the embodiment of the present invention. As shown in FIG. 10, the simulating element 21 simulates the segmentation of the nuclear reactor structure 10 based on the cutting information S and segments the nuclear reactor structure 10 most appropriately. This is the result of the segmentation simulation in Solid Works®. The cutter 40 adjusts the parameters of the cutting information according to the actual situation when segmenting the nuclear reactor structure 10, which may not be the result of the segmentation simulation by Solid Works®.

It should be noted that the simulate segmentation methods of cylinder and pie cake digital models of the present invention may be executed together with not only a computer with a human-machine interface, but also other electronic devices with the human-machine interface which is not limited to the scope of the present invention. In addition, according to the experience of dismantling nuclear power plants in some other countries, several parts with high radiation have been segmented in water. The mechanical segmentation is used mostly, such as using circular saws or band saws. Therefore, the routes scheduled for the segmentation of the parts are all straight. Under the premise of using water as a shielding and adopting remote operation, the present invention does not consider the radiation intensity, and only performs the segmentation simulation on the geometry of the relevant components of the nuclear reactor. Before utilizing the method of the present invention for calculation, the container size and the slit width of the cutter need to be set first, and the setting of the slit width may be used to know the amount of chips generated by the segmentation. The genetic algorithm is used to optimize the calculation, and segmentation simulation is performed on the components related to the nuclear reactor with the goal of minimizing the cutting area. Under the condition of the minimum cutting area, the cutting time and the amount of secondary waste (chips) are minimized, and the life span of the cutter increases, thereby reducing the cost in the actual cutting.

In summary, the simulate segmentation methods of cylinder and pie cake digital models of the present invention utilizes the collocation of the three-dimensional model C and the genetic algorithm to optimize the parameter configuration of the cutting information S, and the cutting area of the nuclear reactor structure 10. The attrition rate of a cutter 40 may be reduced when segmenting the nuclear reactor structure 10 according to the cutting information S. The corresponding three-dimensional model C and parameters may also be selected for simulating segmentation information S according to the different components of the nuclear reactor structure 10. All in all, the simulate segmentation methods of cylinder and pie cake digital models of the present invention has the advantages as described above, thereby achieving the reduction of the attrition rate of the cutter 40 and the minimum cutting area of the nuclear reactor structure.

The above mentioned is only illustrative and not restrictive. Any equivalent modifications or changes made to the spirit and limit of the present invention should be included in the extent of the patent application.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A simulate segmentation method of a cylinder digital model, comprising:

selecting a three-dimensional model and a reference point according to a nuclear reactor structure and obtaining a model height according to a highest point and a lowest point of the three-dimensional model;

simulating segmentation of the nuclear reactor structure along a first direction axis to make the nuclear reactor have a cross section at each cutting position, wherein a cross-sectional area of each of the cross sections is obtained by means of the three-dimensional model and the reference point, and a distance between each of the cutting positions is a cutting height;

using a genetic algorithm to calculate a cutting information, and the genetic algorithm comprising:

setting a positional chromosome having a first corresponding block corresponding to each of the cutting positions, and each of the first corresponding blocks having the corresponding cutting height; repeatedly generating the positional chromosome until a number of the positional chromosome reaches a first constant, wherein the positional chromosome with the first constant is a first initial population;

calculating a sum of a cross-sectional areas and a number of each of the first corresponding blocks of the first initial population as a plurality of first fitness values;

crossing over and mutating each of the positional chromosomes of the first initial population to obtain a plurality of positional abnormal chromosomes, and calculating the sum of the cross-sectional areas and the number of the first corresponding blocks of each of the positional abnormal chromosomes as a first abnormal adaptive value;

arranging an order of each of the first fitness values and each of the first abnormal fitness values, and selecting a plurality of first fine chromosomes according to a first selective condition;

simulating segmentation of each of the first fine chromosomes at the corresponding cross section to make each of the cross sections have an angular cross section at each cutting angle, wherein an angular cross-sectional area of each of the angular cross sections is obtained according to a thickness of the surface and a center of the surface, and a difference value between each of the cutting angles is an angular difference;

setting an angular chromosome having a second corresponding block corresponding to each of the cutting angles and each of the second corresponding blocks having the corresponding angular difference; repeatedly generating the angular chromosome until a number of angular chromosomes reaches a second constant, wherein and the angular chromosomes with the second constant is a second initial population;

calculating the sum of an angular cross-sectional areas and the number of the second corresponding blocks of the second initial population as a plurality of second fitness values;

crossing over and mutating each of the angular chromosomes of the second initial population to obtain a plurality of angular abnormal chromosomes, and calculating the sum of the angular cross-sectional area and the number of the second corresponding blocks of each of the angular abnormal chromosomes as a second abnormal fitness value;

arranging an order of each of the second fitness values and each of the second abnormal fitness values, and selecting a plurality of second fine chromosomes according to a second selective condition; and repeatedly operating the genetic algorithm until an optimal chromosome is selected and each of the cutting positions and each of the angles corresponding to the optimal chromosome are integrated as the cutting information; and segmenting the nuclear reactor structure according to the cutting information.

2. The simulate segmentation method of a cylinder digital model according to claim 1, wherein when the sum of the cutting height of the positional chromosome is higher than the model height, the cutting height is adjusted to be equal to the model height and remaining values of the first corresponding blocks are equal to zero.

3. The simulate segmentation method of a cylinder digital model according to claim 1, wherein when the sum of the angular difference of the angular chromosome is larger than 360 degrees, the sum of the angular difference is adjusted to 360 degrees and remaining values of the second corresponding blocks are equal to zero.

4. The simulate segmentation method of a cylinder digital model according to claim 1, wherein the first selective condition is to select a few of the positional chromosomes and the positional abnormal chromosomes with smaller fitness values as the plurality of first fine chromosomes from the positional chromosomes and the positional abnormal chromosomes, and the number of the plurality of first fine chromosomes is the first constant.

5. The simulate segmentation method of a cylinder digital model according to claim 1, wherein the second selective condition is to select a few of the angular chromosomes and the angular abnormal chromosomes with smaller fitness values as the plurality of second fine chromosomes from the angular chromosomes and the angular abnormal chromosomes, and the number of the plurality of second fine chromosomes is the second constant.

6. A simulate segmentation method of a pie cake digital model, comprising:

selecting a three-dimensional model and a reference point according to a nuclear reactor structure, and obtaining a model height and a model width according to a highest point and a lowest point of the three-dimensional model on a first direction axis and a second direction axis;

simulating segmentation of the nuclear reactor along the first direction axis to make the nuclear reactor have a first cross section at each first cutting position, wherein a first cross-sectional area of each of the first cross section is obtained by means of the three-dimensional model and the reference point, and a distance between each of the first cutting positions is a first cutting height;

using a genetic algorithm to calculate a cutting information, and the genetic algorithm comprising:

setting a first positional chromosome having a first corresponding block corresponding to each of the first cutting positions, and each of the first corresponding blocks having the corresponding first cutting height;

repeatedly generating the first positional chromosome until number of the first positional chromosome reaches a first constant, wherein the first positional chromosome with the first constant is a first initial population;

calculating a sum of a cross-sectional area and a number of each of the first corresponding blocks of the first initial population as a plurality of the first fitness values;

crossing over and mutating each of the first positional chromosomes of the first initial population to obtain a plurality of first positional abnormal chromosomes, and calculating the sum of the cross-sectional area and the number of the first corresponding blocks of each of the first positional abnormal chromosomes as a first abnormal adaptive value;

arranging an order of each of the first fitness values and each of the first abnormal fitness values, and selecting a plurality of first fine chromosomes according to a first selective condition;

simulating segmentation of the first fine chromosomes along a second direction axis to make each of the first fine chromosomes have a second cross section at each of the second cutting positions, wherein a second cross-sectional area of each of the second cross sections is obtained by means of the three-dimensional model and the reference point, and a distance between each of the second cutting positions is a cutting width;

setting a second positional chromosome having a second corresponding block corresponding to each of the second cutting positions, and each of the second corresponding blocks having the corresponding cutting width; repeatedly generating the second positional chromosome until number of the second positional chromosome reaches a second constant, wherein the second positional chromosome with the second constant is a second initial population;

calculating the sum of the second cross-sectional area and the number of the second corresponding blocks of the second initial population as a plurality of second fitness values;

crossing over and mutating each of the second positional chromosomes of the second initial population to obtain a plurality of second positional abnormal chromosomes, and calculating the sum of the second cross-sectional area and the number of the second corresponding blocks of each of the second positional abnormal chromosomes as a second abnormal adaptive value;

arranging an order of each of the second fitness values and each of the second abnormal fitness values, and selecting a plurality of second fine chromosomes according to a second selective condition; and repeatedly calculating the genetic algorithm until an optimal chromosome is selected and each of the first cutting positions and each of the second cutting positions corresponding to the optimal chromosome is a cutting information; and segmenting the nuclear reactor structure according to the cutting information.

7. The simulate segmentation method of a pie cake digital model according to claim 6, wherein when the sum of the first cutting height of the first positional chromosome is higher than the model height, the cutting height is adjusted to be equal to the model height, and remaining values of the first corresponding blocks are equal to zero.

8. The simulate segmentation method of a pie cake digital model according to claim 6, wherein when the sum of the cutting width of the second positional chromosome is greater than the model width, the cutting height is adjusted to be equal to the model width, and remaining values of the second corresponding blocks are zero.

9. The simulate segmentation method of a pie cake digital model according to claim 6, wherein the first selective condition is to select a few of the first positional chromosomes and the first positional abnormal chromosomes with smaller fitness values as the plurality of first fine chromosomes from the first positional chromosomes and the first positional abnormal chromosomes, and the number of the plurality of first fine chromosomes is the first constant.

10. The simulate segmentation method of a pie cake digital model according to claim 6, wherein the second selective condition is to select a few of the second positional chromosomes and the second positional abnormal chromosomes with smaller fitness values as the plurality of second fine chromosomes from the second positional chromosomes and the second positional abnormal chromosomes, and the number of the plurality of second fine chromosomes is the second constant.

* * * * *